United States Patent
Takahashi et al.

(10) Patent No.: US 9,303,987 B2
(45) Date of Patent: Apr. 5, 2016

(54) TILT ANGLE DETECTING DEVICE

(71) Applicant: Kabushiki Kaisha TOPCON, Itabashi-ku, Tokyo-to (JP)

(72) Inventors: Takashi Takahashi, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 122 days.

(21) Appl. No.: 14/204,439

(22) Filed: Mar. 11, 2014

(65) Prior Publication Data

US 2014/0259712 A1 Sep. 18, 2014

(30) Foreign Application Priority Data

Mar. 15, 2013 (JP) .................. 2013-053699

(51) Int. Cl.
*G01C 9/18* (2006.01)
*G01C 9/06* (2006.01)

(52) U.S. Cl.
CPC .. *G01C 9/18* (2013.01); *G01C 9/06* (2013.01); *G01C 2009/066* (2013.01)

(58) Field of Classification Search
CPC .............................. G01C 9/06; G01C 2009/066
USPC .......................................... 33/366.16, 366.23
See application file for complete search history.

(56) References Cited

U.S. PATENT DOCUMENTS

| | | | | |
|---|---|---|---|---|
| 3,324,564 A * | 6/1967 | Wright | ...................... | G01C 9/06 250/231.1 |
| 4,484,393 A * | 11/1984 | LaFreniere | ............... | G01C 9/32 33/348.2 |
| 4,647,767 A * | 3/1987 | Jubinski | ................... | G01C 9/06 250/227.25 |
| 5,794,355 A * | 8/1998 | Nickum | ................... | G01C 9/06 33/366.16 |
| 6,248,989 B1 * | 6/2001 | Ohishi | ...................... | G01C 9/06 250/205 |
| 6,343,422 B1 * | 2/2002 | Takahashi | ................ | G01C 9/06 33/366.16 |
| 7,263,778 B2 * | 9/2007 | Lang | ........................ | G01C 9/32 33/379 |
| 7,526,870 B2 * | 5/2009 | Klapper | .................... | G01C 9/06 33/366.11 |
| 7,818,891 B2 * | 10/2010 | Roemhild | ................ | G01C 9/06 33/366.16 |
| 7,964,806 B2 * | 6/2011 | Freydank | ................ | G01G 23/10 177/185 |
| 2006/0037204 A1 * | 2/2006 | Gruetzmacher | ......... | G01C 9/34 33/379 |
| 2008/0172894 A1 * | 7/2008 | Chang | ...................... | G01C 9/06 33/366.16 |

FOREIGN PATENT DOCUMENTS

| | | |
|---|---|---|
| JP | 10-239052 A | 9/1998 |
| JP | 2001-50745 A | 2/2001 |
| JP | 2006-506656 A | 2/2006 |
| JP | 2011-47812 A | 3/2011 |

* cited by examiner

*Primary Examiner* — Christopher Fulton
(74) *Attorney, Agent, or Firm* — Nields, Lemack & Frame, LLC (57) ABSTRACT

The invention provides a tilt angle detecting device which has a two-liquid tube (19), comprising a transparent container (16) containing a first liquid (17) and a second liquid (18) having different property, specific gravity, and optical transmissivity from each other, wherein a movement occurs between the first liquid and the second liquid by tilting of the transparent container.

15 Claims, 5 Drawing Sheets

TILT ANGLE DETECTING DEVICE

BACKGROUND OF THE INVENTION

The present invention relates to a tilt angle detecting device including a tilt sensor, which has two types of liquids, each having different properties, as sealed in a transparent container, and which detects tilting by detecting a relative movement between the liquids.

As means for detecting a tilt of an instrument or a device, an air bubble tube is known, and the air bubble tube is a glass container with a liquid and an air bubble sealed in. In a case where an instrument or a device is to be installed for a case where horizontality is required such as a surveying instrument, a tilt angle detecting device provided with the air bubble tube is used. As the air bubble tube, a photo-electric air bubble tube is known, which detects the movement of air bubbles in the air bubble tube photo-electrically. By referring to FIG. 7 to FIG. 9, description will be given below on a conventional type tilt angle detecting device having the photo-electric air bubble tube.

Figure 7:
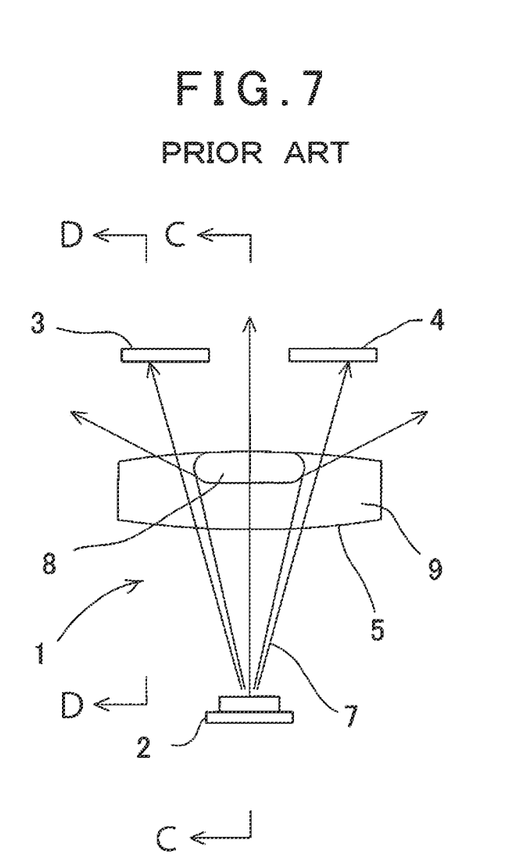
FIG. 7 is a schematical cross-sectional view to show an air bubble tube of a conventional type tilt angle detecting device.

A photo-electric air bubble tube 1 comprises a light source 2, photodetection elements 3 and 4, and an air bubble tube 5 in approximately cylindrical shape, and a tilt angle is detected based on signals from the photo-electric air bubble tube 1.

The light source 2 is disposed below the air bubble tube 5, and an optical axis of the light source 2 perpendicularly crosses a center line of the air bubble tube 5. A pair of the photodetection elements 3 and 4 are positioned opposite to the light source 2 with the air bubble tube 5 between them, and are disposed at such positions symmetrical with respect to the optical axis of the light source 2 and at positions separated by a distance as required from each other. As the photodetection elements 3 and 4, photo-electric conversion elements are used.

As shown in FIG. 7, in a direction passing through the center line, a detection light 7 advances approximately in a straightforward direction and passes through air bubbles 8 and a liquid 9 in the air bubble tube 5 and are received by the photodetection elements 3 and 4. In boundary portion between the air bubbles 8 and the liquid 9, the detection light 7 is reflected and the detection light 7 is not detected by the photodetection elements 3 and 4.

Figure 8:
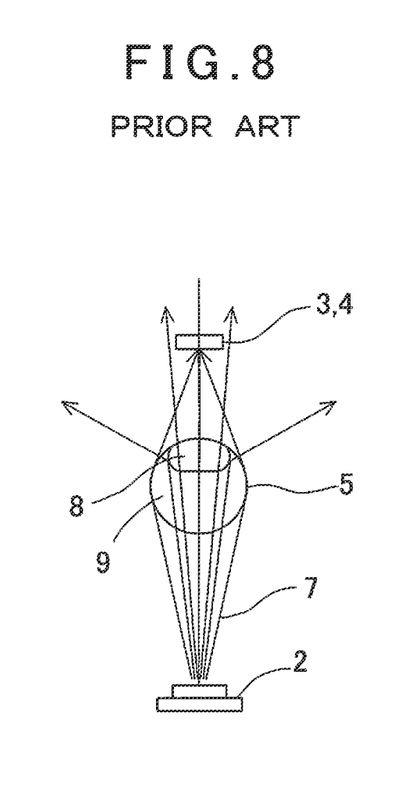
FIG. 8 is an arrow diagram along the line C-C in FIG. 7.
Figure 9:
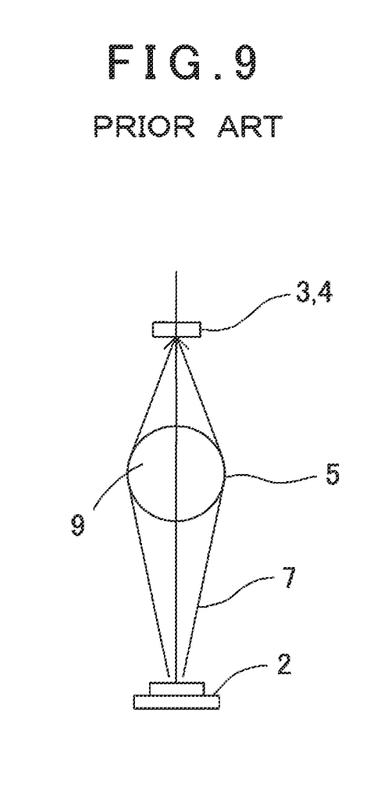
FIG. 9 is an arrow diagram along the line D-D in FIG. 7.

FIG. 8 is a cross-sectional view of a portion where the air bubbles 8 of the air bubble tube 5 exists, and FIG. 9 is a cross-sectional view of portion of the liquid 9 where the air bubbles 8 of the air bubble tube 5 do not exist. As shown in FIG. 8, in a case where the air bubbles 8 exist, the detection light 7 straightly projected through the center of the air bubbles 8 is received by the photodetection elements 3 and 4. Also, the detection light 7 passing through the liquid 9 around the air bubbles 8 is received by the photodetection elements 3 and 4 due to an optical action. Further, upon reaching a boundary portion between the air bubbles 8 and the liquid 9, the detection light 7 is reflected by a boundary surface, and the detection light 7 is not received by the photodetection elements 3 and 4. Therefore, differences occur in the light amount, which are received by the photodetection elements 3 and 4 in such a degree as reflected by the boundary surface, between the portion where the air bubbles 8 exist and the portion where the air bubbles 8 do not exist, as shown in FIG. 9.

Therefore, the light amount of the detection light 7 entering the photodetection elements 3 and 4 varies according to the position of the air bubbles 8. Since the position of the air bubbles 8 varies according to the tilting, the tilt angle can be detected by detecting the difference of photodetection amount between the photodetection element 3 and the photodetection element 4.

However, in the conventional type tilt angle detecting device, there have been problems in that a portion of the detection light 7, which passed through the air bubbles 8, is detected by the photodetection elements 3 and 4 as steady state light noise and the S/N ratio is decreased.

Also, in the conventional type tilt angle detecting device, since a dynamic range of the photo-electric type air bubble tube 1 is smaller, it is difficult to secure detection accuracy. Further, fine adjustment is needed for the setting when the center line of the air bubble tube 5 is set to perpendicularly cross the optical axis of the detection light 7, and an adjusting mechanism is further provided. As a result, there have been problems in that the structure becomes more complicated.

SUMMARY OF THE INVENTION

It is an object of the present invention to provide a tilt angle detecting device, which can improve the photodetection sensitivity of the photodetection elements while maintaining the dynamic range when detecting the tilt angle.

To attain the above object, the tilt angle detecting device which has a two-liquid tube according to the present invention comprises a transparent container containing a first liquid and a second liquid having different property, specific gravity, and optical transmissivity from each other, wherein a movement occurs between the first liquid and the second liquid by tilting of the transparent container.

Further, in the tilt angle detecting device according to the present invention, a hollow and convex type escape portion is formed on the transparent container, and a gas is sealed in the escape portion.

Further, in the tilt angle detecting device according to the present invention, the second liquid is colored by either one of a coloring matter, a dyestuff or a pigment so that the second liquid differs from the first liquid in transmissivity of a detection light.

Further, in the tilt angle detecting device according to the present invention, the first liquid has a specific gravity higher than that of the second liquid.

Further, in the tilt angle detecting device according to the present invention, the first liquid is either one of the following: alcohol type, ether type, acetal type, ketone type, ester type, polyhydric alcohol and its dielectric substances, phenol type, nitride compound type, sulfur or phosphorus containing organic solvent type, hydrocarbon type liquid, substance containing silicon such as silicone oil, and fluorine type solvent, and the second liquid is either one of the following but is a liquid different from the first liquid: alcohol type, ether type, acetal type, ketone type, ester type, polyhydric alcohol and its dielectric substances, phenol type, nitride compound, sulfur or phosphorus containing solvent type, hydrocarbon type liquid, substance containing silicon such as silicone oil, and fluorine type solvent.

Further, in the tilt angle detecting device according to the present invention, in a case where one of the first liquid and the second liquid is a hydrocarbon type liquid, the other is either one of the following: alcohol type, ether type, acetal type, ketone type, ester type, polyhydric alcohol and its dielectric substance, phenol type, nitride compound type, sulfur or phosphorus containing organic solvent type, substance containing silicon such as silicone oil, or fluorine type solvent.

Further, in the tilt angle detecting device according to the present invention, in a case where one of the first liquid and the second liquid is a substance containing silicon such as silicone oil, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or fluorine type solvent.

Further, in the tilt angle detecting device according to the present invention, in a case where one of the first liquid and the second liquid is a fluorine type solvent, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or substance containing silicon such as silicone oil.

According to the present invention, the tilt angle detecting device which has a two-liquid tube, comprises a transparent container containing a first liquid and a second liquid having different property, specific gravity, and optical transmissivity from each other, wherein a movement occurs between the first liquid and the second liquid by tilting of the transparent container. As a result, the detection light reaching the second liquid is not detected by the photodetection elements and it possible to increase the S/N ratio. Further, photodetection sensitivity is increased because a difference of photodetection amount of the photodetection elements is increased, and even when the dynamic range is extended, sufficient detection accuracy can be obtained.

Further, according to the present invention, in the tilt angle detecting device, a hollow and convex type escape portion is formed on the transparent container, and a gas is sealed in the escape portion. As a result, even in a case where the first liquid and the second liquid are expanded due to the change of temperature or air pressure, the expansion can be absorbed by compression of the gas in the escape portion, and the damage of the transparent container due to expansion can be prevented.

Further, according to the present invention, in the tilt angle detecting device, the second liquid is colored by either one of a coloring matter, a dyestuff or a pigment so that the second liquid differs from the first liquid in transmissivity of a detection light. As a result, it is possible to prevent the detection light passing through the second liquid from being received by the photodetection elements.

Further, according to the present invention, in the tilt angle detecting device, the first liquid has a specific gravity higher than that of the second liquid. As a result, the second liquid can be floated on the first liquid, and the position of the second liquid can be changed by tilting of the transparent container.

Further, according to the present invention, in the tilt angle detecting device, the first liquid is either one of the following: alcohol type, ether type, acetal type, ketone type, ester type, polyhydric alcohol and its dielectric substances, phenol type, nitride compound type, sulfur or phosphorus containing organic solvent type, hydrocarbon type liquid, substance containing silicon such as silicone oil, and fluorine type solvent, and the second liquid is either one of the following but is a liquid different from the first liquid: alcohol type, ether type, acetal type, ketone type, ester type, polyhydric alcohol and its dielectric substances, phenol type, nitride compound, sulfur or phosphorus containing solvent type, hydrocarbon type liquid, substance containing silicon such as silicone oil, and fluorine type solvent. This makes it possible to prevent the mixing of the first liquid and the second liquid.

Further, according to the present invention, in the tilt angle detecting device, in a case where one of the first liquid and the second liquid is a hydrocarbon type liquid, the other is either one of the following: alcohol type, ether type, acetal type, ketone type, ester type, polyhydric alcohol and its dielectric substance, phenol type, nitride compound type, sulfur or phosphorus containing organic solvent type, substance containing silicon such as silicone oil, or fluorine type solvent. This makes it possible to prevent the mixing of the first liquid and the second liquid.

Further, according to the present invention, in the tilt angle detecting device, in a case where one of the first liquid and the second liquid is a substance containing silicon such as silicone oil, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or fluorine type solvent. This makes it possible to prevent the mixing of the first liquid and the second liquid.

Furthermore, according to the present invention, in the tilt angle detecting device, in a case where one of the first liquid and the second liquid is a fluorine type solvent, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or substance containing silicon such as silicone oil. This makes it possible to prevent the mixing of the first liquid and the second liquid.

DETAILED DESCRIPTION OF THE PREFERRED EMBODIMENT

Description will be given below on an embodiment of the present invention by referring to the attached drawings.

First, referring to FIG. 1 to FIG. 4, description will be given on a tilt angle detecting device according to the embodiment of the present invention. It is to be noted that, since the photo-electric type two-liquid tubes 11 and 12 have the same structure, description will be given below on the photo-electric type two-liquid tube 11.

Figure 2:
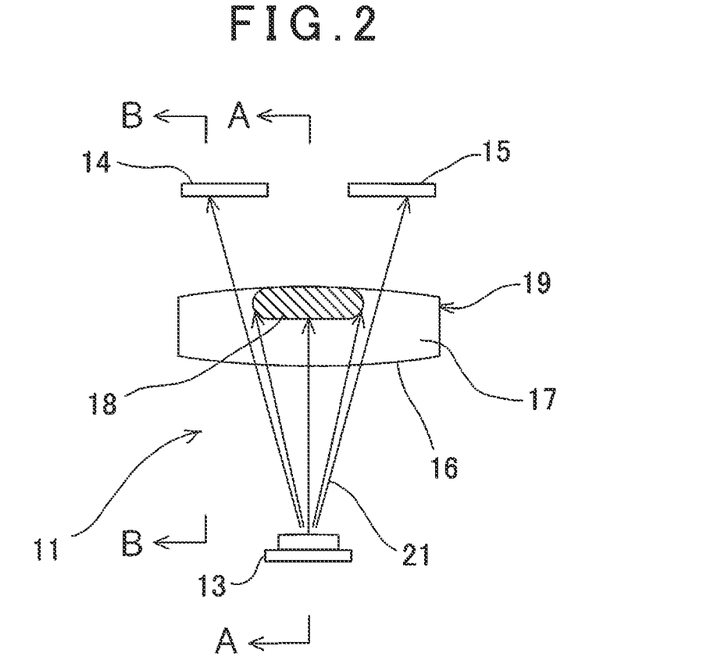
FIG. 2 is a schematical cross-sectional view to show a photo-electric type two-liquid tube of the tilt angle detecting device according the embodiment of the present invention.
Figure 3:
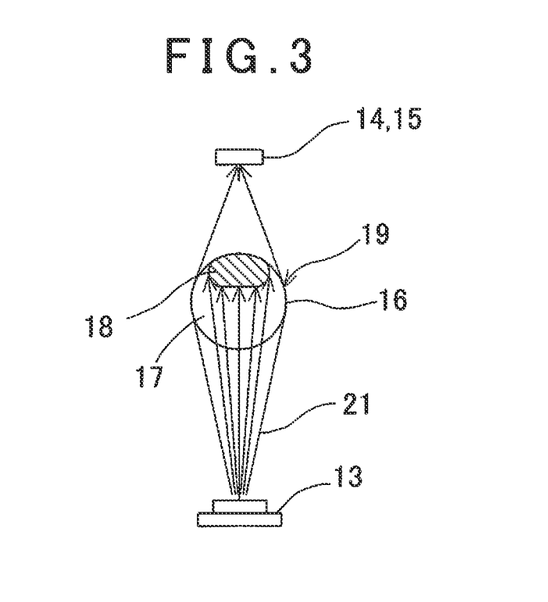
FIG. 3 is an arrow diagram along the line A—A in FIG. 2.
Figure 4:
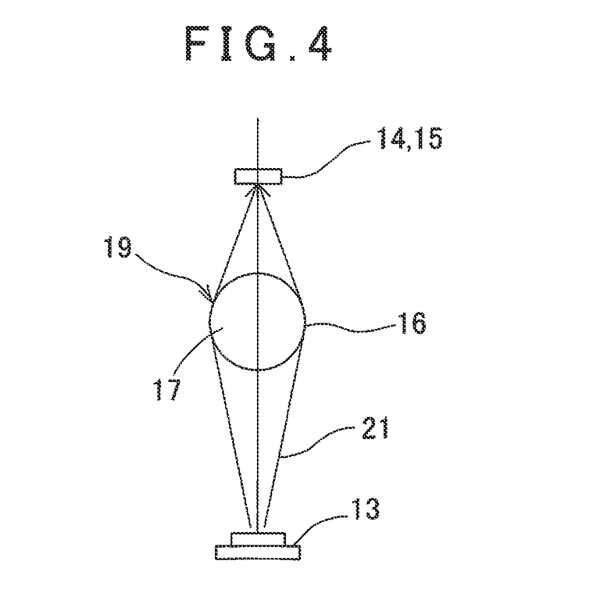
FIG. 4 is an arrow diagram along the line B-B in FIG. 2.

The photo-electric type two-liquid tube 11 comprises a light source 13 and photodetection elements 14 and 15, and a two-liquid tube 19 which comprises a transparent container 16 and a first liquid 17 and a second liquid 18 sealed in the transparent container 16.

The light source 13 such as an LED is disposed in a direction perpendicularly crossing a center line of the two-liquid tube 19. Further, a pair of the photodetection elements 14 and 15 are positioned opposite to the light source 13 with the two-liquid tube 19 between them, and are disposed at such a position symmetrical with respect to the optical axis of the light source 13 and at a position separated by a distance as required from each other.

The transparent container 16 is a transparent container made of glass and designed in a barrel-like shape having its central portion with thick diameter. In the transparent container 16, the first liquid 17 and the second liquid 18 are sealed in, which have different specific gravities and relatively different polarities (having different properties), and constituted so that the first liquid 17 and the second liquid 18 will not be mixed together. It is to be noted that, in the description as given below, the specific gravity of the second liquid 18 is lower than the specific gravity of the first liquid 17.

Also, the first liquid 17 and the second liquid 18 are different from each other in transmissivity with respect to a wavelength of a detection light 21 as projected from the light source 13. For instance, the first liquid 17 is a colorless and transparent liquid which fills up most of the transparent container 16 and allows the detection light 21 projected from the light source 13 to pass through. Further, the second liquid 18 is sealed in the transparent container 16 and is a colored liquid—a liquid of black color, for instance—, and the second liquid 18 interrupts or almost interrupts the detection light 21.

The first liquid 17 and the second liquid relatively differ from each other in polarity, and the specific gravity of the second liquid 18 is lower than that of the first liquid 17. Therefore, the second liquid 18 floats on the first liquid 17 without being mixed in the second liquid tube 19 and contacts with the inner surface of the two-liquid tube 19 due to buoyancy.

Figure 1:
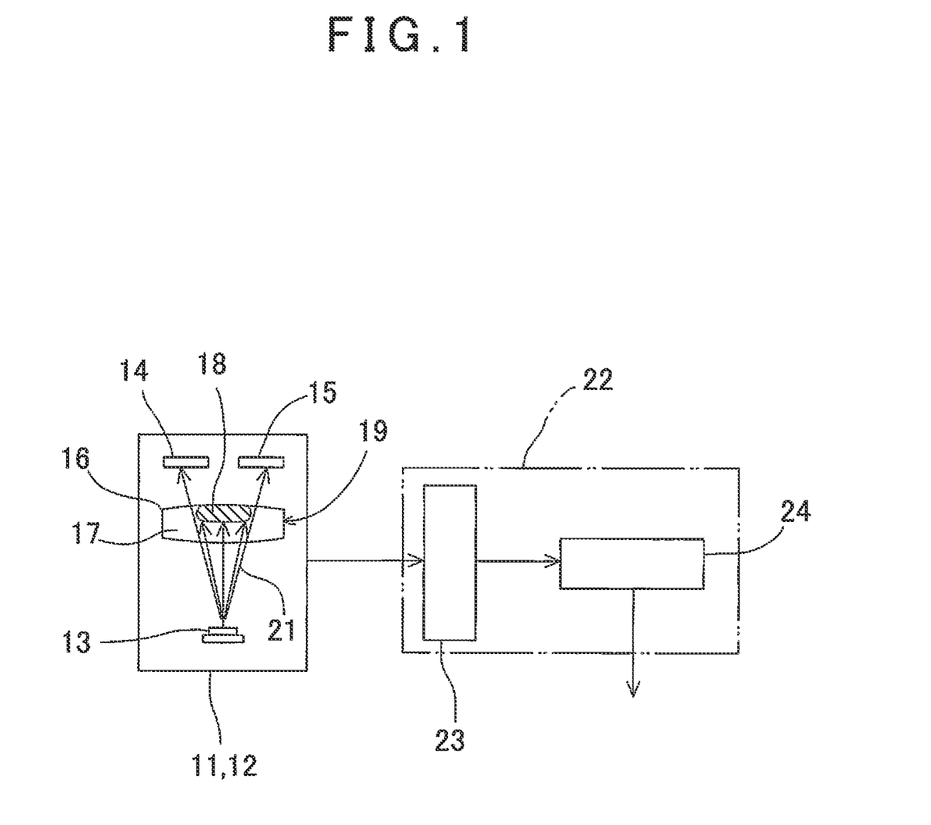
FIG. 1 is a block diagram to show general features of a tilt angle detecting device according to an embodiment of the present invention.

The light source 13 is driven by a light source driving unit (not shown), and the detection light 21 emitted from the light source 13 passes through the two-liquid tube 19 and reaches the photodetection elements 14 and 15. When the detection light 21 is received by the photodetection elements 14 and 15, signals corresponding to the amount of light as received are outputted from the photodetection elements 14 and 15 to a tilt angle detection control unit 22, which is a calculating unit. It is to be noted that the photo-electric type two-liquid tubes 11 and 12 and the tilt angle detection control unit 22, etc. make up a tilt angle detection device.

The tilt angle detection control unit 22 has a differential amplifier 23 and a control arithmetic unit 24. In the differential amplifier 23, a difference of electric current of output signals from the photodetection elements 14 and 15 is amplified and is outputted to the control arithmetic unit 24 after being converted by current-voltage conversion. In the control arithmetic unit 24, signals from the differential amplifier 23 are processed, and a tilt angle is calculated.

In this case, the first liquid 17 is a colorless and transparent liquid, and the detection light 21 emitted from the light source 13 passes through the first liquid 17. On the other hand, the second liquid 18 is a colored liquid—a liquid of black color, for instance—having lower transmissivity than the first liquid 17, and the detection light 21 is absorbed by the second liquid 18 and is interrupted.

When reaching the second liquid 18, the detection light 21 is interrupted by the second liquid 18 and the detection light 21 do not leak out of the two-liquid tube 19. So, the detection light 21 is not received by the photodetection elements 14 and 15. Accordingly, the steady state light noise is removed, and the S/N ratio can be improved. Also, by improving the S/N ratio, resolving power (reproducibility) can be improved.

Further, in a case where the second liquid 18 exist on an optical path of the detection lights 21, all or almost all of the detection lights 21 are interrupted. In a case where the second liquid 18 does not exist on the optical paths of the detection lights 21, all of the detection lights 21 pass through the first liquid 17 and are received by the photodetection elements 14 and 15. Therefore, between the case where the second liquid 18 exist on the optical paths of the detection lights 21 and the case where the second liquid 18 does not exist on the optical paths of the detection lights 21, the difference of light amount of the detection lights 21 reaching the photodetection elements 14 and 15 becomes larger.

And, in a case where the second liquid 18 moves in the transparent container 16, a big difference occurs in the light detection amount between the photodetection element 14 and the photodetection element 15, and a deviation obtained by calculation at the control arithmetic unit 24 also increases. Therefore, this makes it possible to increase the photodetection sensitivity of the photodetection elements 14 and 15, and a sufficient accuracy can be attained even when a dynamic range is expanded.

Further, since the dynamic range of the tilt angle detection device is expanded, fine adjustment is not necessary when setting the two-liquid tube 19. Accordingly, adjusting mechanism is not necessary, and this contributes to the simplification of the structure of the device and to the decrease of the manufacturing cost.

Next, description will be given on details of the first liquid 17 and the second liquid 18.

The following types of liquids are used as the liquid to be used as the first liquid 17 and the second liquid 18. As a high polarity substance, substances such as alcohol type, ether type, acetal type, ketone type, ester type, polyhydric alcohol and its dielectric substances, phenol type, nitride compound type, sulfur or phosphorus containing organic solvent type, etc. can be used. As a low polarity substance, substances such as hydrocarbon type liquid, substance containing silicon such as silicone oil, fluorine type solvent, etc. can be used.

In a case where one of the high polarity substances as given above is selected as the first liquid 17, one of the low polarity substances as given above is selected as the second liquid 18. Further, in a case where one of the low polarity substances as given above is selected as the first liquid 17, one of the high polarity substances as given above is selected as the second liquid 18. Or, from the low polarity substances as given above, the liquids different from each other are selected as the first liquid 17 and the second liquid 18 respectively.

When the first liquid 17 and the second liquid 18 are selected, one of the high polarity substances or one of the low polarity substances is first selected as the second liquid 18 since the specific gravity of the second liquid 18 changes due to the coloration. After the selection of the second liquid 18, the second liquid 18 is colored by use of a coloring matter or a dyestuff or a pigment so that transmissivity of the second liquid 18 with respect to the wavelength of the detection light 21 will be lower than the transmissivity of the first liquid 17 with respect to the wavelength of the detection light 21.

For instance, dyestuff or pigment such as azo type dyestuff, polycyclic pigment, lake pigment, etc. are dissolved in the second liquid 18, and the second liquid 18 is colored. Or, pigments such as carbon is diffused by performing carbonyl processing, acid processing or carboxyl processing on the surface of the second liquid 18, and the second liquid 18 is colored.

After the second liquid 18 is colored, a substance with higher specific gravity than that of the second liquid 18 after coloring is selected as the first liquid 17. By sealing the first liquid 17 and the second liquid 18 into the transparent container 16, the first liquid 17 and the second liquid 18 can be separated from each other in the transparent container 16. By separating the first liquid 17 and the second liquid 18 from each other, the second liquid 18 floats on the first liquid 17, and the second liquid 18 can be brought to a state where the second liquid 18 contacts with the inner surface of the transparent container 16. Therefore, by the tilt of the two-liquid tube 19, the second liquid 18 can be moved.

Figure 5:
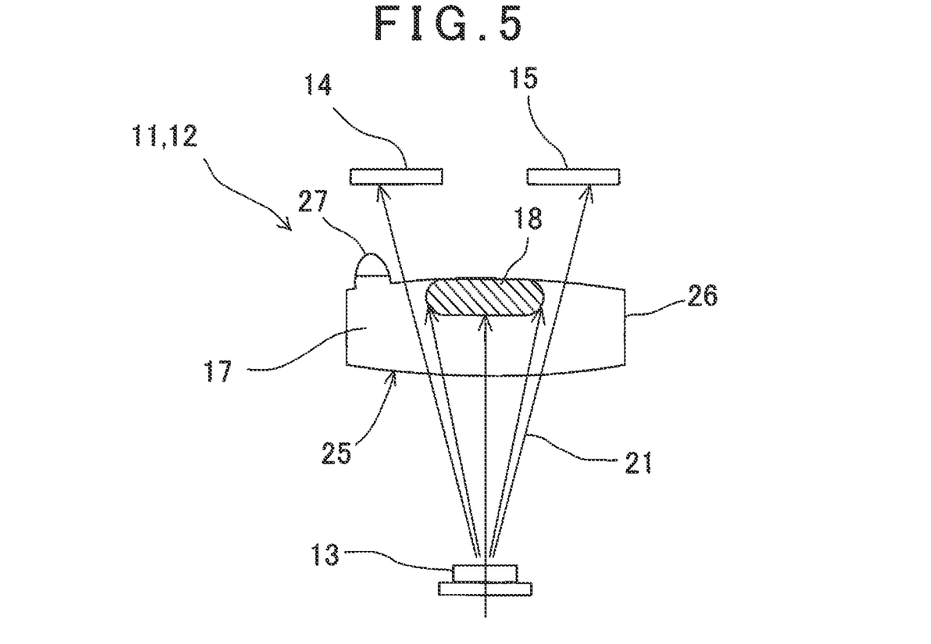
FIG. 5 is a schematical cross-sectional view to show a variation example of the photo-electric type two-liquid tube.

FIG. 5 shows a variation example of the photo-electric two-liquid tubes 11 and 12 in the tilt angle detecting device.

In a two-liquid tube 25 as shown in the variation example, a convex type escape portion 27 is formed on the surface of the transparent container 26. The escape portion 27 is designed as hollow, and a gas such as an air is contained inside. Further, a liquid surface of the first liquid 17 is protruded from the inner surface of the transparent container 26 so as to be positioned inside the escape portion 27.

Because the escape portion 27 is formed on the transparent container 26 and the gas is sealed in the escape portion 27, even when the first liquid 17 and the second liquid 18 are expanded due to the change in temperature or air pressure, the expansion of the first liquid 17 and the second liquid 18 can be absorbed because the gas in the escape portion 27 is compressed, and damage of the transparent container 26 can be prevented.

Further, since the liquid surface of the first liquid 17 is positioned inside the escape portion 27, leakage of the gas in the escape portion 27 into the transparent container 26 can be prevented when the two-liquid tube 25 is tilted.

It is to be noted that, although the escape portion 27 is disposed at one point in FIG. 5, it is needless to say that the escape portions 27 may be provided at two points or more.

Also, in the first embodiment and in the variation example, the specific gravity of the first liquid 17 is set higher than the specific gravity of the second liquid 18, but it may be so arranged that the specific gravity of the first liquid 17 is set lower than the specific gravity of the second liquid 18 so that the second liquid 18 sinks in the first liquid 17.

Figure 6:
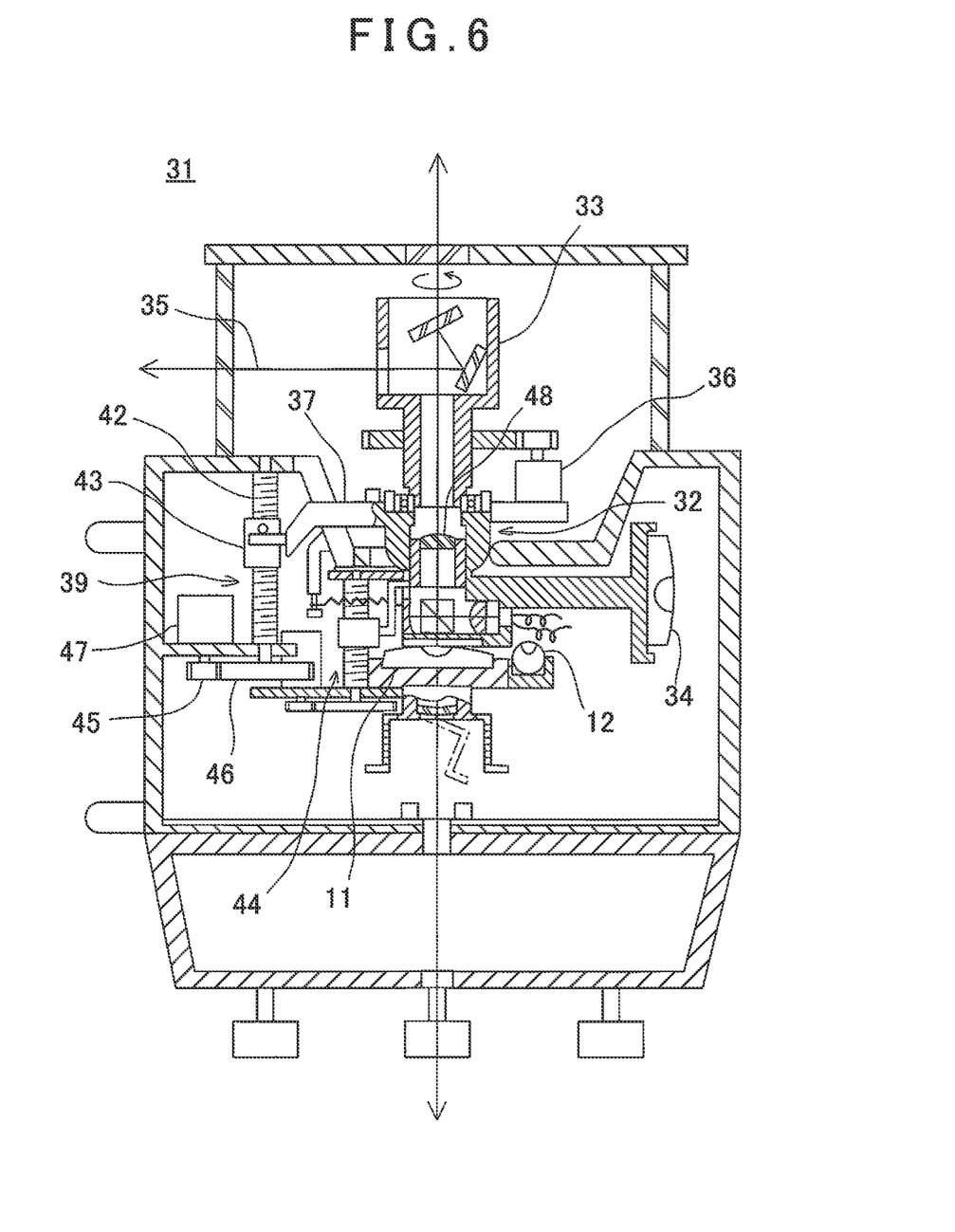
FIG. 6 is a schematical cross-sectional view of a laser surveying instrument, on which a tilt angle detecting device according the embodiment of the present invention is installed.

FIG. 6 shows one example of a laser surveying instrument on which a tilt angle detecting device, according to the present embodiment, is mounted.

A laser surveying instrument 31 projects a laser beam 35 with directivity in horizontal direction by rotary irradiation and forms a rotary irradiation surface. A photodetection device (not shown) positioned on the rotary irradiation surface receives and detects the laser beam 35 and determines the projecting positions. As a result, a reference line or a reference plane is obtained.

A laser beam projecting unit 32 is tiltably supported, and on its head, has a rotating unit 33, which can be rotated around an optical axis of the laser beam projecting unit 32 as the center. The photo-electric two-liquid tubes 11 and 12 perpendicularly crossing in the horizontal plane are provided on the laser beam projecting unit 32, and a tilt sensor 34 in vertical direction is further provided.

The rotating unit 33 deflects the laser beam 35 projected in a vertical direction to a horizontal direction and is rotated by a scanning motor 36 and project the laser beam 35 in rotary irradiation.

From the laser beam projecting unit 32, arms 37 and 38 (arm 38 is not shown in the figure) are extended in two horizontal directions perpendicularly crossing each other, and a forward end of each of the arms 37 and 38 is engaged with the tilting mechanism.

The tilting mechanism has two sets of tilt driving units 39 and 40 provided with respect to the arms 37 and 38 respectively (tilt driving unit 40 is not shown in the figure), and has a tilt control unit (not shown) for controlling the tilt driving units 39 and 40. Each of the tilt driving units 39 and 40 has a screw 42 extending in the direction of the optical axis of the laser beam projecting unit 32, a nut 43 screwed in the screw 42 and abutted to the forward end of each of the arms 37 and 38, a tilt adjusting motor 47 for rotating the screw 42 via gears 45 and 46, and others. Further, in the figure, reference numeral 44 denotes a focus adjusting unit. The focus adjusting unit 44 performs focusing of the laser beams 35 by moving a condenser lens 48, as disposed on an optical path of the laser beam projecting unit 32, in the direction of optical axis.

As shown in FIG. 1, the tilt angle detection control unit 22 comprises the differential amplifier 23 where photodetection signals from the photodetection elements 14 and 15 are inputted and the control arithmetic unit 24 for calculating the tilt with respect to a direction of gravity based on the output signal from the differential amplifier 23 and for issuing control signals. Based on the control signals from the control arithmetic unit 24, a driving circuit (not shown) drives the tilt adjusting motor 47, and the optical axis of the laser beam projecting unit 32 is adjusted to the vertical or to an angle as required.

The laser beam 35 is projected in horizontal direction from the rotating unit 33, and by rotating the rotating unit 33 by the scanning motor 36, a rotary irradiation surface is formed. Also, by setting the scanning position of the laser beam 35 at a predetermined position by the photodetection device, a reference plane can be obtained.

By obtaining the reference plane, it becomes possible to easily determine the working position in wide range. For instance, the setting of the positions of windows in an interior finishing work of construction work, or the ground leveling in civil engineering operation, etc.

The invention claimed is:

1. A tilt angle detecting device which has a two-liquid tube, comprising a transparent container containing a first liquid and a second liquid having different property, specific gravity, and optical transmissivity from each other, wherein a movement occurs between said first liquid and said second liquid by tilting of said transparent container, and a hollow and convex type escape portion is formed on said transparent container, and a gas is sealed in said escape portion.

2. A tilt angle detecting device according to claim 1, wherein said second liquid is colored by either one of a coloring matter, a dyestuff or a pigment so that said second liquid differs from said first liquid in transmissivity of a detection light.

3. A tilt angle detecting device according to claim 2, wherein said first liquid has a specific gravity higher than that of said second liquid.

4. A tilt angle detecting device according to claim 3, wherein said first liquid is either one of the following: alcohol type, ether type, acetal type, ketone type, ester type, polyhydric alcohol and its dielectric substances, phenol type, nitride compound type, sulfur or phosphorus containing organic solvent type, hydrocarbon type liquid, substance containing silicon such as silicone oil, and fluorine type solvent, and said second liquid is either one of the following but is a liquid different from said first liquid: alcohol type, ether type, acetal type, ketone type, ester type, polyhydric alcohol and its dielectric substances, phenol type, nitride compound, sulfur or phosphorus containing solvent type, hydrocarbon type liquid, substance containing silicon such as silicone oil, and fluorine type solvent.

5. A tilt angle detecting device according to claim 4, wherein, in a case where one of said first liquid and said second liquid is a hydrocarbon type liquid, the other is either one of the following: alcohol type, ether type, acetal type, ketone type, ester type, polyhydric alcohol and its dielectric substance, phenol type, nitride compound type, sulfur or phosphorus containing organic solvent type, substance containing silicon such as silicone oil, or fluorine type solvent.

6. A tilt angle detecting device according to claim 4, wherein, in a case where one of said first liquid and said second liquid is a substance containing silicon such as silicone oil, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or fluorine type solvent.

7. A tilt angle detecting device according to claim 4, wherein, in a case where one of said first liquid and said second liquid is a fluorine type solvent, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or substance containing silicon such as silicone oil.

8. A tilt angle detecting device according to claim 2, wherein said first liquid is either one of the following: alcohol type, ether type, acetal type, ketone type, ester type, polyhydric alcohol and its dielectric substances, phenol type nitride compound type, sulfur or phosphorus containing organic solvent type, hydrocarbon type liquid, substance containing silicon such as silicone oil, and fluorine type solvent, and said second liquid is either one of the following but is a liquid different from said first liquid: alcohol type, ether type, acetal type, ketone type, ester type, polyhydric alcohol and its dielectric substances, phenol type, nitride compound, sulfur or phosphorus containing solvent type, hydrocarbon type liquid, substance containing silicon such as silicone oil, and fluorine type solvent.

9. A tilt angle detecting device according to claim 8, wherein, in a case where one of said first liquid and said second liquid is a hydrocarbon type liquid, the other is either one of the following: alcohol type, ether type, acetal type, ketone type, ester type, polyhydric alcohol and its dielectric substance, phenol type, nitride compound type, sulfur or phosphorus containing organic solvent type, substance containing silicon such as silicone oil, or fluorine type solvent.

10. A tilt angle detecting device according to claim 8, wherein, in a case where one of said first liquid and said second liquid is a substance containing silicon such as silicone oil, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or fluorine type solvent.

11. A tilt angle detecting device according to claim 8, wherein, in a case where one of said first liquid and said second liquid is a fluorine type solvent, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or substance containing silicon such as silicone oil.

12. A tilt angle detecting device according to claim 1, wherein said first liquid is either one of the following: alcohol type, ether type, acetal type, ketone type, ester type, polyhydric alcohol and its dielectric substances, phenol type, nitride compound type, sulfur or phosphorus containing organic solvent type, hydrocarbon type liquid, substance containing silicon such as silicone oil, and fluorine type solvent, and said second liquid is either one of the following but is a liquid different from said first liquid: alcohol type, ether type, acetal type, ketone type, ester type, polyhydric alcohol and its dielectric substances, phenol type, nitride compound, sulfur or phosphorus containing solvent type, hydrocarbon type liquid, substance containing silicon such as silicone oil, and fluorine type solvent.

13. A tilt angle detecting device according to claim 12, wherein, in a case where one of said first liquid and said second liquid is a hydrocarbon type liquid, the other is either one of the following: alcohol type, ether type, acetal type, ketone type, ester type, polyhydric alcohol and its dielectric substance, phenol type, nitride compound type, sulfur or phosphorus containing organic solvent type, substance containing silicon such as silicone oil, or fluorine type solvent.

14. A tilt angle detecting device according to claim 12, wherein, in a case where one of said first liquid and said second liquid is a substance containing silicon such as silicone oil, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or fluorine type solvent.

15. A tilt angle detecting device according to claim 12, wherein, in a case where one of said first liquid and said second liquid is a fluorine type solvent, the other is either one of the following: alcohol type, ether type, acetal type, ketone type, ester type, polyhydric alcohol and its dielectric substance, phenol type, nitride compound type, sulfur or phosphorus containing organic solvent type, hydrocarbon type liquid, or substance containing silicon such as silicone oil.

* * * * *